United States Patent [19]

Delpech et al.

[11] 4,140,352

[45] Feb. 20, 1979

[54] DEVICE FOR AUTOMATICALLY BRAKING THE WHEEL OF A VEHICLE

[75] Inventors: Jean-Claude Delpech, Toulouse; Pierre Gentet, Colomiers; Bernard P. M. Verse, Blagnac; Gilbert R. Pujos, Toulouse, all of France

[73] Assignee: Societe Nationale Industrielle Aerospatiale, Paris, France

[21] Appl. No.: 817,138

[22] Filed: Jul. 20, 1977

[30] Foreign Application Priority Data

Aug. 3, 1976 [FR] France .................................. 76 23665

[51] Int. Cl.$^2$ .............................................. B60T 8/12
[52] U.S. Cl. ..................................... 303/93; 244/111; 303/20
[58] Field of Search .................... 188/181 A; 244/111; 303/20, 93, 97, 100, 103, 105, 106, 108; 364/426

[56] References Cited

U.S. PATENT DOCUMENTS

| | | | |
|---|---|---|---|
| 3,382,012 | 5/1968 | Lucien | 303/93 |
| 3,520,575 | 7/1970 | Steigerwald | 303/93 |
| 3,609,313 | 9/1971 | Lucien | 303/93 X |
| 3,829,167 | 8/1974 | Rouf et al. | 303/93 |

Primary Examiner—Stephen G. Kunin
Attorney, Agent, or Firm—Merriam, Marshall & Bicknell

[57] ABSTRACT

The invention relates to a device for automatically braking the wheel of a vehicle, in which a hydraulic brake controlled by a mechanical member is associated with the wheel and is controlled by an electrohydraulic servovalve receiving an electric signal for controlling a transmitter charged with converting the displacements of the mechanical member into electric signals, wherein, between the transmitter and the servovalve, the device comprises a switch which, for a first position, directly connects the transmitter and the servovalve and which, for a second position, connects the output of the transmitter to one of the inputs of a first adder whose output is connected to the servovalve, the other input of this first adder being connected to the output of an automatic braking signal generator. The invention is more particularly applied to the braking of aircraft.

18 Claims, 5 Drawing Figures

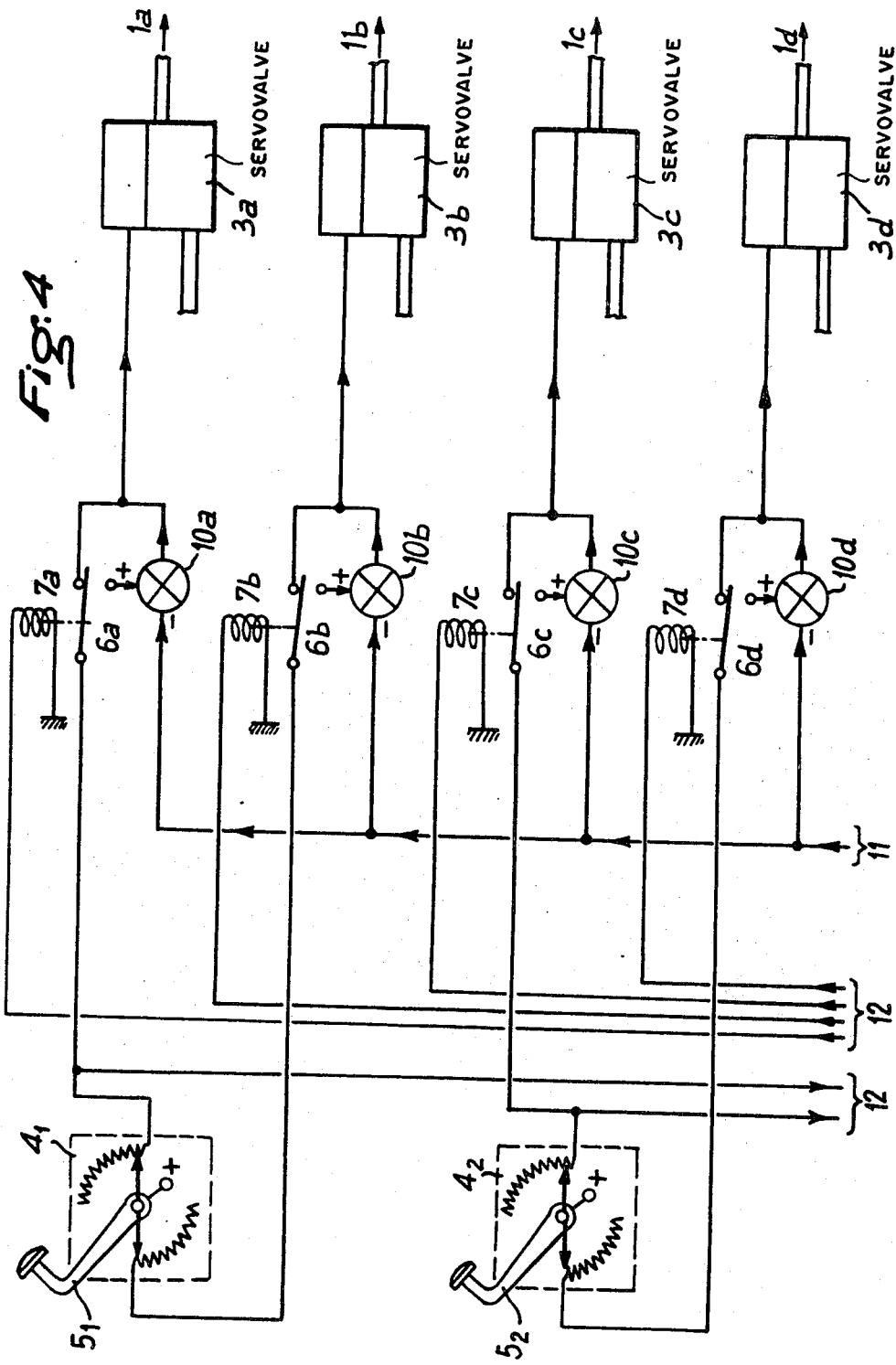

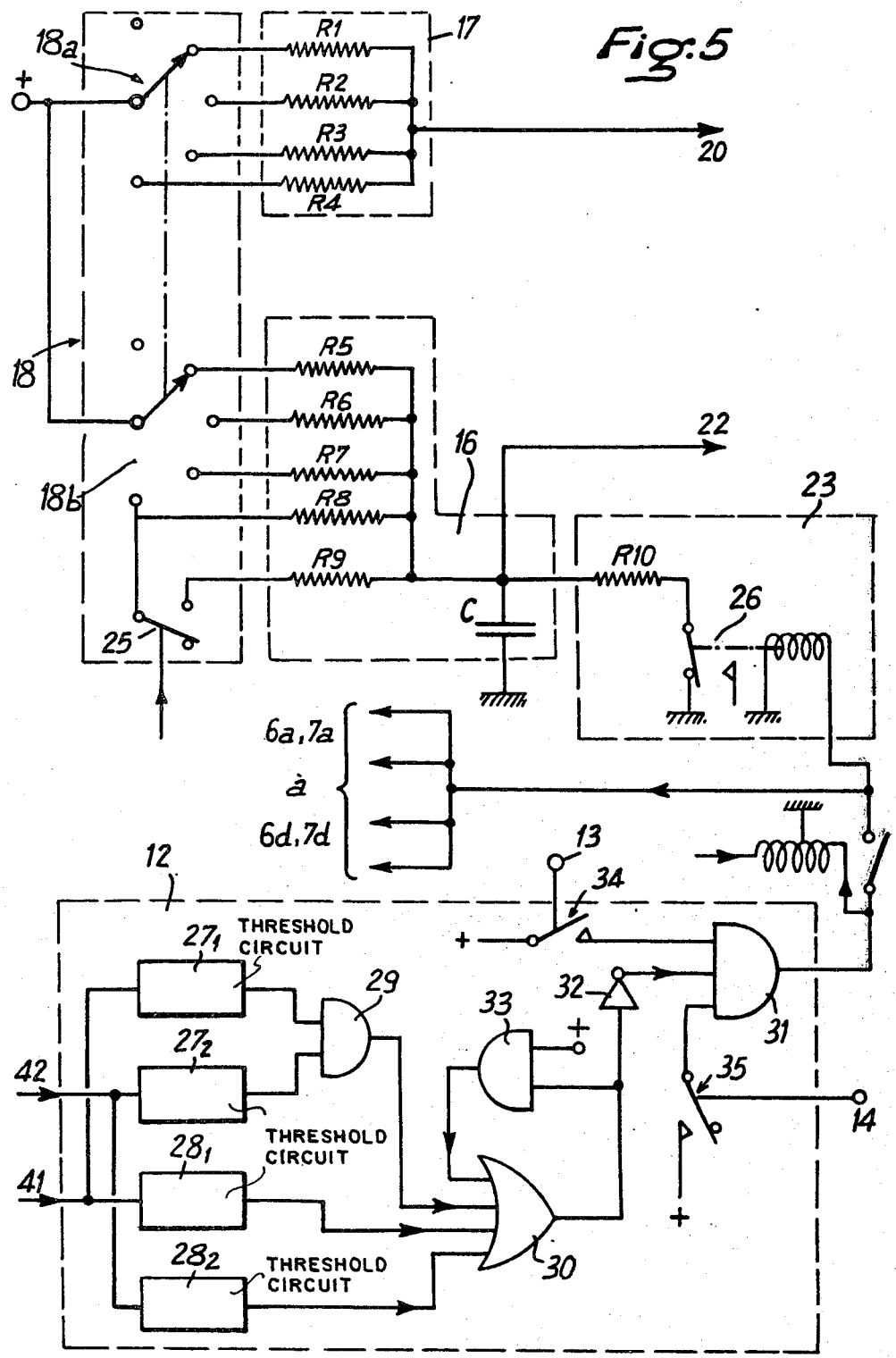

DEVICE FOR AUTOMATICALLY BRAKING THE WHEEL OF A VEHICLE

The present invention relates to an automatic braking device, particularly for aircraft, adapted for use both for touchdown and taking off, during an emergency stop whilst the aircraft is in acceleration.

The device according to the invention enables the pilot's work load to be reduced during touchdown and a constant deceleration of the aircraft to be obtained as a function of the length of the runway, whilst allowing a differential braking by moderate action on one of the brake pedals, and the taking over of the braking by the pedals, without jerks, by progressive annulment of the automatic braking.

It also enables the time for effecting braking in the case of emergency stop to be reduced and is extremely reliable due to the use of electric and electronic circuits for producing the braking level.

The use of the device according to the invention has for its consequence to improve the safety and comfort of the passengers whilst limiting the wear of the tires and brakes, requiring said latter to supply only the torque necessary for a programmed deceleration, thus annulling the locking of wheels which produce wear and tear and vibrations.

Different automatic braking devices are already known. Certain of them may only be used for vehicles on rails. These devices, generally of the compressed air type, are very heavy and require markers disposed on the rails to trigger off the different phases of braking. These devices are designed for very heavy equipment and in no wise can be used nor even adapted for aircraft.

Automatic braking devices for aircraft are also known. Certain of them are of the entirely hydraulic type and represent the first generation of automatic or semi-automatic braking devices for aircraft and possibly for road vehicles. These devices generally have limited possibilities, are relatively heavy and cumbersome and require frequent revisions due to the complexity of their hydraulic elements. Their process of regulation cannot involve the variations in gains of the brakes.

Other devices for aircraft are both electronic and hydraulic, or entirely electronic, apart from the last circuit which always comprises a tank, an electrovalve, a servovalve and the brake cylinders. These devices are intended to obtain a braking with constant deceleration, possibly programmed as a function of the length and state of the landing runway. Such devices are for example described in U.S. Pat. Nos. 3,920,278 and 3,917,356.

These devices are complex and do not act directly on the current delivered by the electric brake pedal position transmitters. They therefore do not allow the taking over of the braking by the pedals without jerks, nor the braking with one pedal only (left-hand or righthand) offering the possibility of a differential braking (stronger braking on one side of the aircraft than the other, to counter for example a strong gust of wind from the side or an uneven runway).

The present invention relates to a braking device, particularly for aircraft, which remedies all these drawbacks.

To this end, according to the invention, the device for automatically braking the wheel of a vehicle, such as an aircraft, in which a hydraulic brake, controlled by a mechanical member, for example a pedal, is associated with said wheel and is controlled by an electrohydraulic servovalve receiving an electric signal for controlling a transmitter charged with converting the displacements of said mechanical member into electric signals, is noteworthy in that, between said transmitter and said servovalve, said device comprises a switch which, for a first position, directly connects the transmitter and the servovalve and which, for a second position, connects the output of said transmitter to one of the inputs of a first adder whose output is connected to said servovalve, the other input of this first adder being connected to the output of an automatic braking signal generator which comprises on the one hand a generator emitting such a predetermined signal which corresponds to the maximum pressure allowed for the hydraulic fluid in the brake and, on the other hand, means for possibly correcting this predetermined automatic braking signal as a function of the difference between the actual deceleration of the vehicle and a predetermined reference deceleration corresponding to the chosen predetermined automatic braking signal.

In this way, the electric signals (current or voltage) supplied by the electric pedal position transmitter are treated by the automatic braking signal generator before arriving at the servovalve. In known manner, in the absence of depression of the pedal, the transmitter may furnish a rest current which corresponds to the complete de-braking at the level of the servovalve, the maximum braking being obtained with the aid of a much weaker current.

In the following specification, only currents will be taken into consideration but the reasoning would be the same for the voltages.

This treatment consists in modifying each of the currents furnished by the pedal position transmitter by the necessary value so as not to exceed the programmed deceleration in a selector. The modification of the currents of the transmitter may be effected on the current itself (partial parallel by-pass, for example) or on an image of this current, the resultant image then having to be converted into current before the signal is sent to the servovalve.

In the case of an aircraft, it is known that the braking device comprises two pedals and that each of the two pedals is associated with a main landing gear (therefore on one "side" of the aircraft). If the two pedals are released, the automatic braking device according to the invention sends an identical current in all the associated servovalves. If one of the pedals is activated, the signals furnished by the corresponding transmitter will develop in the sense of braking. As there corresponds to the constant deceleration of the aircraft an average braking pressure in all the wheels, thus an average braking current, the deceleration regulator will reduce its action so that the sum of the currents coming from the transmitters and the regulator of the assembly of the wheels remains constant. The braking of the wheels corresponding to the activated pedal will increase and the braking of the wheel corresponding to the other pedal will reduce. This results in a differential braking but always with constant deceleration of the aircraft.

In order to ensure a progressive increase in the deceleration, the pressure in the braking circuit is established progressively, in exponential form, by means of an R-C (resistor-capacitor) circuit. The automatic braking device ensures this function by progressively modifying the currents of the pedal transmitters. The importance of the maximum modification possible (final value) is such that it enables the reference deceleration to be obtained in the most unfavourable case (skidding of the wheels, aquaplaning), particularly due to the fact that the effective deceleration of the vehicle is measured with the aid of a decelerometer integrated in said device and not by by-pass of a wheel speed signal.

The sliding of said wheels therefore does not occur with the device according to the invention. It is taken into account by another device (non-skid device). This modification corresponds to the maximum pressure allowed in the brakes for the rate of deceleration chosen with the aid of the selector.

The deceleration of the aircraft is therefore established and increases progressively as far as the reference value chosen under the influence of the progressive modification of the signal issuing from the transmitter, said modification being as described hereinabove.

When the deceleration of the aircraft tends to exceed the reference value, and only in this case, the automatic braking correction means come into play. The correction then reduces the modification made to the currents coming from the pedal transmitters. This results in a peak-clipping functioning.

A logic assembly monitors the triggering and stopping of the functioning of the device according to the invention as a function of certain conditions such as extension of the landing gear, pressurisation thereof, extension of the spoilers, depression of one or the two brake pedals, breakdowns.

For example, when the aircraft has reached the clearance speed on the taxiways of the runways, or for any other cause, the cut-off of the automatic braking may be effected:

either by a simultaneous and moderate depression of the two pedals, or by a slamming of one brake pedal only.

These depressions are detected by the level of the electric current coming from the pedal position transmitters.

The cut-off of the braking may then be effected either immediately or progressively. The braking obtained upon depression of one or the two pedals will be the one corresponding to the most important, in the sense of braking, of the following two orders:

order of decreasing braking of the automatic braking device (obtained by progressively reducing the importance of the modification made to the signal from the pedal transmitter)

order corresponding to the depression of the or each pedal.

After a time T of transition from one order to the other, the braking now depends only on the pedal transmitter. The automatic braking current having become virtually zero or zero at this instant, the current received by the servovalve is that emitted by the transmitter, hence the absence of jerks when the current corresponding to the "automatic braking" is replaced by the current of the transmitter.

The device according to the invention therefore enables the automatic braking mode to pass easily to the mode of braking by the pedals. The signals produced according to the two modes are equal at the moment of switching.

Furthermore, it will be noted that the device according to the invention may be mounted on aircraft fitted with an electric braking control but not provided to receive it, since it does not require any adaptation of the existing hydraulic circuits, no more than possibly existing electric braking circuits such as for example braking regulating circuits intended to avoid locking of the wheels when the limit of adhesion of said wheels is reached during a braking phase.

The device according to the invention requires only the introduction of equipment which is peculiar thereto and mainly of an automatic braking selector and an automatic brake housing.

This latter particularly includes the decelerometer which supplies the main information necessary for regulating the deceleration.

The selector constitutes the element for controlling and displaying the information at the disposal of the aircraft crew. It comprises a certain number of selection keys enabling a deceleration to be programmed, i.e. a braking distance as a function of the length and state of the runway. These keys comprise a luminous signalling apparatus.

The invention will be more readily understood on reading the following description with reference to the accompanying drawings, in which:

FIG. 4 illustrates the application of the braking device according to the invention to an aircraft.

Figure 1:
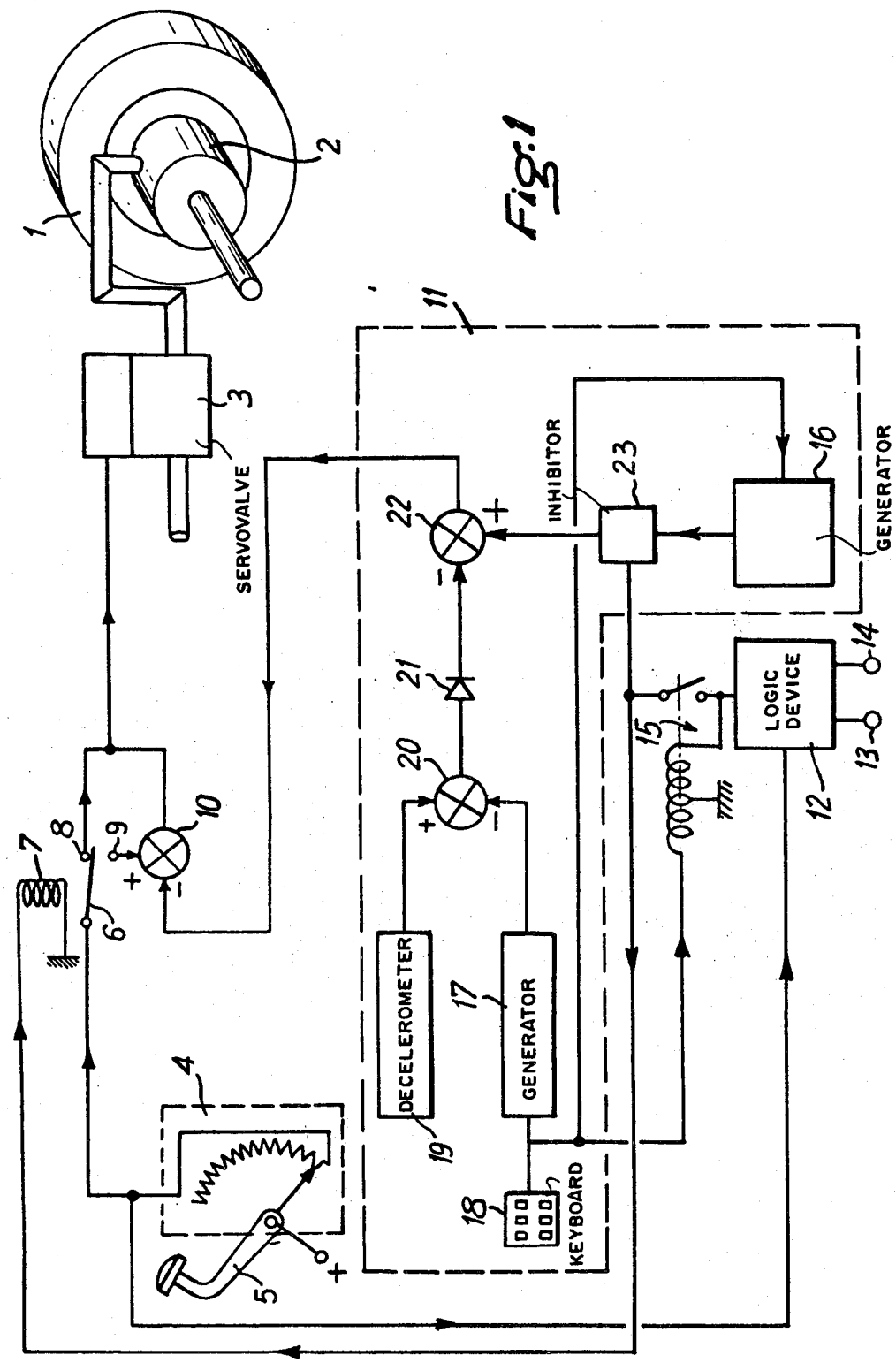
FIG. 1 shows a block diagram of the automatic braking device according to the invention.

FIG. 5 gives the electrical diagram of part of the circuits of the device of FIG. 1, applied to the device of FIG. 4.

In these Figures, like references, possibly given indices, designate like elements.

Referring now to the drawings, FIG. 1 shows an automatic braking device according to the invention which is intended to brake a wheel 1 mounted on a vehicle (not shown) and provided with a hydraulic brake 2. The brake 2 is actuated by an electrohydraulic servovalve 3 controlling the passage of a hydraulic fluid under pressure in a conduit connected to a source of such a fluid (not shown). The electrohydraulic servovalve 3 is itself controlled by an electric signal coming from a pedal transmitter 4, associated with a pedal 5. Such a transmitter comprises, in known manner, a potentiometer whose slider is connected in displacement to the pedal 5.

Between the transmitter 4 and the servovalve 3 is disposed a two-position switch. To simplify matters, this switch is shown in the form of a pivoting tongue 6, controlled by a winding 7, but it is obvious that it may be formed by a static semi-conductor switch.

The tongue 6 comprises a resting contact 8, due to which it directly connects the transmitter 4 to the servovalve 3 and a working contact 9, which connects the transmitter 4 to the positive input of an adder 10, the output of which is connected to the control input of the servovalve 3. The negative input of the adder 10 is connected to the output of a device 11 for producing the automatic braking signal.

The switch 6, 7 and the device 11 are controlled, in the manner described hereinafter, by a logic device 12 which, furthermore, receives the output signal from the transmitter 4. By terminals 13 and 14, the logic device 12 receives signals coming from outside detectors furnishing thereto necessary operational conditions (examples of which are given in the embodiment described with reference to FIG. 3). The logic device 12 controls the switch 6, 7 and the device 11 by means of a controlled switch 15.

The device 11 comprises a signal generator 16, emitting a braking signal which is exponential as a function of the time, of the capacitor load type, and a generator 17 furnishing an electric signal representing a desired reference deceleration for a braking of the vehicle. The generators 16 and 17 are each adapted to furnish a plurality of signals of different parameters, but with each signal of the generator 16 there is associated a corresponding signal from the generator 17.

Figure 2:
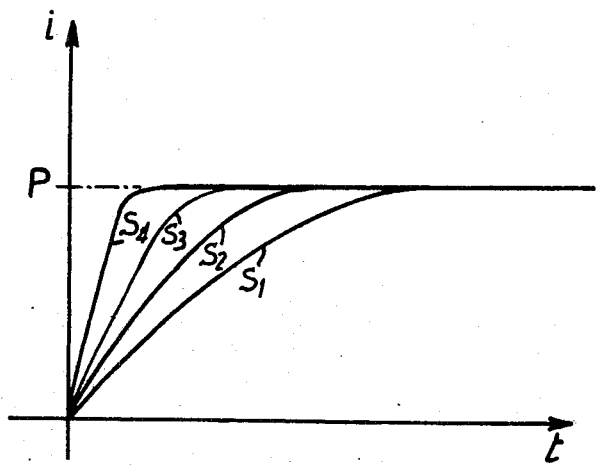
FIG. 2 illustrates an example of establishment of the automatic braking current, thus of the pressure in the brakes, if the non-skid device is not used.

FIG. 2 illustrates, as a function of time t, the variation in the intensity i of the signals delivered by the generator 16. As may be seen, these signals $S_1$, $S_2$, $S_3$ and $S_4$ present different climbing times, but extend by the same level plateau P, which corresponds to the maximum pressure allowed for the hydraulic fluid admitted in the brake 2.

The two associated signals (from generator 16 and generator 17) are simultaneously selected by means for example of a keyboard 18 which also enables the controlled switch 15, which is normally open, to be closed. The choice between the different pairs of associated signals is made in particular as a function of the possible braking distance, i.e. in the case of an aircraft, the length of the runway.

The device 11 comprises, moreover, a decelerometer 19, mounted on the vehicle and adapted to supply at each instant the value of the deceleration of said vehicle. The signals coming from generator 17 and decelerometer 19 are compared in a comparator 20 which provides an output representing the difference between the second and the first signals. When this difference is positive, it is transmitted by a diode 21, to the negative input of another adder 22, of which the positive input receives the signal from generator 16, through an inhibition device 23, controlled by the logic device 12, through switch 15.

The automatic braking device functions in the following manner.

When the switch 6, 7 is in rest position, i.e. when the tongue 6 occupies the position shown in FIG. 1, the braking device functions in conventional manner by the driver (or pilot) of the vehicle acting on pedal 5. The transmitter 4 is such that, when no pressure is applied to pedal 5, it delivers a maximum current (or voltage), whilst, on the contrary, when the pedal 5 is in its position corresponding to maximum braking, the current delivered by said transmitter 4 is minimum. Consequently, a depression of the pedal 5 causes a reduction in the electric current at the output of the transmitter 4, which directly sends a corresponding braking order, via the tongue 6, to the servovalve 3. Said latter consequently controls the hydraulic brake 2, which then acts on wheel 1.

When the driver of the vehicle decides on an automatic braking manoeuvre, he manipulates the keyboard 18 on the one hand to close the controlled switch 15, and on the other hand to choose a reference deceleration value (in 17) and a law of braking Si, with $1 \leq i \leq 4$, (in 16). This choice is made as a function of the desired braking distance for the vehicle.

If the outside conditions, represented on terminals 13 and 14, are realised, the logic device 12 on the one hand supplies the winding 7 to cause the tongue 6 to tip on contact 9, on the other hand acts on the inhibitor 23 to eliminate its inhibiting action. The generator 16 then sends its signal Si to the adder 22.

If the actual deceleration of the vehicle, measured by the decelerometer 19, is less than the value of the selected reference deceleration, the adder 22 receives no signal from comparator 20 and the signal Si is transmitted totally to the adder 10. On the other hand, if the present deceleration of the vehicle is greater than the value of the reference deceleration, the adder 22 receives from comparator 20 the positive difference of these two decelerations and this difference is subtracted (in 22) from signal Si. The adder 10 therefore receives only part of signal Si.

It will be noted that, due to the decelerometer 19, the automatic braking device according to the invention takes numerous, parameters into account such as state of the runway, state of the tires, gain of the brake, etc...

The current signal emitted by adder 22 in the direction of adder 10 is, in the latter, subtracted from current signal coming from transmitter 4, to form the signal controlling the servovalve 3.

As has been seen hereinabove, if the driver does not touch the pedal 5, the current signal emitted by the transmitter 4 is maximum, whilst if the pedal is slightly depressed, the intensity of this signal decreases. Consequently, the intensity of the signal transmitted to the servovalve 3 depends on whether or not the drive is actuating the pedal 5. However, due to the presence of the decelerometer 19, this variation in the control current of the servovalve remains without influence on the real braking effect, at least to a certain extent.

In fact, if for one reason or another, the driver of the vehicle wishes to take over the control of the braking himself, it is sufficient for him to depress the pedal 5 a little more. The logic device 12, which receives the output signal from transmitter 4, reacts beyond a certain threshold of reduction of this signal to cause the switch 15 to tip into its rest position, and to cut the supply of the winding 7 and render the inhibitor 23 active. The braking device is then returned into its initial state, which allows its conventional control, solely via the pedal 5.

Figure 3:
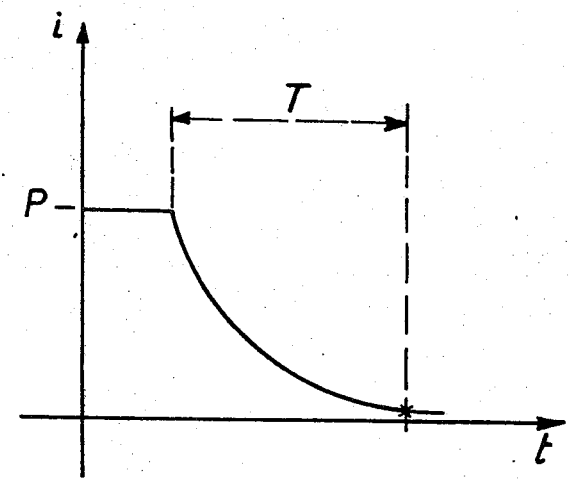
FIG. 3 illustrates the variation in the braking current upon passage from an automatic braking phase to a braking phase by pedal, the variation in the pressure in the brake having substantially the same trend.

However, upon passage of an automatic braking phase to a braking phase by pedal, the switch 6, 7 reconnects the output of the transmitter 4 on the servovalve 3, with a determined delay T, equal to the time of decrease of the current emitted by generator 16 (cf. FIG. 3). This time T is determined by this generator 16 and it may, for example, be 3 seconds.

FIG. 4 illustrates the application of the device of FIG. 1 to the braking device of an aircraft, which comprises on the one hand a righthand braking pedal $5_1$, associated with a double transmitter $4_1$ and intended to control the braking of the right-hand wheels 1a and 1b of a landing gear of this aircraft and, on the other hand, a left-hand braking pedal $5_2$ associated with a double transmitter $4_2$ and intended to control the braking of the left-hand wheels 1c and 1d of said landing gear. To this end, each suitable portion of the transmitter $4_1$ or $4_2$ is connected, in a manner similar to that described with reference to FIG. 1, to a corresponding servovalve 3a to 3d, via respective switches 6a, 7a to 6d, 7d and of adders 10a to 10d. All the negative inputs of the adders 10a to 10d are connected at the output of a common device 11, whilst all the switches 6a, 7a to 6d, 7d are controlled by a common logic device 12, which furthermore receives a part of the output currents of at least a portion of each of the transmitters $4_1$ and $4_2$.

FIG. 5 shows the diagram of elements 12, 16, 17, 18 and 23 of FIG. 1, applied to the device of FIG. 4. This Figure shows that the keyboard 18 comprises a first selector 18a with five positions, one position corresponding to the switching off of the device. The studs corresponding to the other positions are connected to resistors R1, R2, R3 and R4 of which the outputs are connected to one another in parallel and connected to the negative input of the adder 20 (FIG. 1).

The slider of said selector 18a is supplied with current by a source referenced +.

Said resistors make it possible to obtain, according to the one which is connected, a current corresponding to a braking pressure itself corresponding to a determined deceleration, e.g. 0.1 g, 0.2 g, 0.3 g, 0.6 g.

The keyboard 18 also comprises a second selector 18b with five positions, the slider of which is mechanically coupled to the slider of the selector 18a and is supplied in parallel by the same source. The selector 18b comprises a switch-off stud and four active studs which are connected to four resistors R5, R6, R7, R8, the outputs of which are connected together and connected to a capacitor C. It also comprises a resistor R9 also connected to the capacitor C, and the other end of which is connected to the stud of the resistor R8 via a contactor 25, closed when the front landing gear of the aircraft is under stress (extended).

The resistor R9 is at that moment in parallel on R8 and therefore reduces the value of the load resistance of the capacitor C, when the selector 18b is on the position corresponding to R8. This arrangement corresponds to the emergency stop functioning which may be necessary during take-off. The resistors are of decreasing values from R5 to R8. They determine the time of rise of the braking pressure up to the maximum value allowed, this value possibly being peak-clipped by the signal corresponding to the difference between the actual deceleration of the aircraft and the reference deceleration.

The other end of the capacitor C is connected to earth. Its end connected to the resistors is connected to the + input of the adder 22 and to earth by means of a resistor R10 and a relay 26, closed in rest position.

The relay 26 opens when it is activated by the logic device 12. Said latter determines the opening of the relay 26 when a deceleration and its speed of establishment having been selected with the aid of selector 18, the main landing gear is extended and placed under stress by the aircraft taxiing, when the spoilers (flaps destroying lift) are opened and when an action of value determined by the thresholds is not exerted on one or the two pedals (according to said thresholds). At this moment, the voltage at the terminals of the capacitor C rises to attain its maximum value, at the speed determined by the selection of selector 18. Inversely, the device 12 determines the release, thus the closure of said relay 26 when the spoilers are returned into position, when the gear is retracted or extended, but does not touch the ground, or when an action is effected on the two pedals according to a first threshold, or when an action is effected on a single pedal according to a second threshold higher than the first.

These thresholds are determined by threshold circuits $27_1$, $27_2$ and $28_1$, $28_2$. The circuits $27_1$, $27_2$ correspond to the same first threshold and circuits $28_1$, $28_2$ to the same second threshold. These circuits are activated in two's by a small part of the current coming from the right-hand transmitter $4_1$ or from the left-hand transmitter $4_2$. The inputs of the two threshold circuits $27_1$ and $28_1$ are connected to $4_1$, whilst the inputs of the threshold circuit $27_2$ and $28_2$ are connected to $4_2$. The outputs of the circuits $27_1$ and $27_2$ are connected respectively to the two inputs of an AND gate 29, the output of which is connected to one of the four inputs of an OR gate 30. These threshold circuit are constituted by flip-flops which change state for determined input current values.

The outputs of the circuits $28_1$ and $28_2$ are respectively connected to two of the inputs of the OR gate 30. The output of the OR gate 30 is connected on the one hand to one of the three inputs of an AND gate 31 via a logic reversing switch 32 and on the other hand to one of its inputs via an AND gate 33 with two inputs, the other input being connected to a source of level 1 (referenced +).

This latter circuit constitutes a memory which maintains a level 1 at the output of the OR gate 30 each time that a level 1 is formed and as long as a level 1 is present on the second input of the AND gate 33. This level 1 on the AND gate 33 is furnished by the general supply of the device which is de-activated only after complete touchdown, or after the landing gear has retracted.

The other two inputs of the AND gate 31 are each connected to a source of level 1 by means of contactors 34 and 35. These contactors are open at rest. The contactor 34 closes when the spoilers are extended (signal on terminal 13) and the contactor 35 closes when the main landing gear is extending and is under stress (signal on terminal 14).

The output of the AND gate 31 is connected, through the controlled switch 15, on the one hand to relay 26, which is actuated, and therefore open, when a level 1 appears at the output of AND gate 31, and on the other hand, in parallel, to switches 6a, 7a to 6d, 7d.

As has been indicated, these relays, at rest, connect the transmitters $4_1$ and $4_2$ to the servovalves 3a to 3d. When they are activated, they connect said transmitters on the adders 10a to 10d, without time-lag. On the contrary, when they are de-activated, they take their rest position with a time-lag, for example of 3 seconds.

In this way, when a deceleration has been programmed and the aircraft is running on its main landing gear and possibly on its front gear, a speed of climb of the deceleration having been automatically programmed (by 18), and no threshold is exceeded, a level 0 appears at the output of the OR gate 30, and, the contacts 34 and 35 being closed, three levels 1 form at the inputs of the AND gate 31, thus a level 1 at the output thereof.

The switch 15 closes and the relay 26 opens; the capacitor C takes its maximum load progressively. Switches 6a, 7a to 6d, 7d connect the pedal transmitters $4_1$ and $4_2$ on adders 10a to 10d. The current issuing from adder 22 is then subtracted from the currents of the transmitters.

The deceleration is regulated by subtracting (peak-clipping) the signal at the terminals of the capacitor C by the signal formed in the adder 20, i.e. by the difference between the actual deceleration and the programmed deceleration.

During this phase, the pilot of the aircraft may intervene to make a differential braking. If he activates one pedal $5_1$ or $5_2$ without exceeding the second threshold, the current of the corresponding transmitter will reduce. The current issuing from the adder 22 will therefore be subtracted from a weaker current and the corresponding servovalve will receive a weaker current and the brakes a greater pressure. The aircraft will therefore be braked more strongly on one side than the other, but the regulation of the overall deceleration of the aircraft will continue to be effected, as the decelerometer 19 will detect a stronger deceleration and the deceleration of the aircraft will increase and peak-clip the signal issuing from the capacitor C more strongly. Consequently, the general automatic braking signal will reduce and the signal in all the servovalves increase, thus the general braking will reduce and automatically compensate the supplementary braking brought by the action of the pilot. (The purpose of this action is to correct a change of direction of the aircraft due, for example, to the state of the runway or to a strong gust of wind).

Consequently, the deceleration remains constant and the device according to the invention allows a differential braking whilst conserving the functioning of automatic braking with constant and programmed deceleration.

If the activation of one pedal exceeds the second threshold, a level 1 appears at the output of one of the circuits $28_1$ or $28_2$. This level 1 is found at the output of the OR gate 30 and is then maintained by the AND gate 33. Consequently, a level 0 is produced at the output of the reversing switch 32 and consequently of the AND gate 31.

The relay 26 is therefore de-activated and the capacitor C will discharge through resistor R10, to a residual level corresponding to a zero braking. This discharge will be effected, for example, in 3 seconds. The relays 6a, 7a to 6d, 7d will be simultaneously de-activated in three seconds, and at the moment of their switching, only the current of the transmitters will be present at the output of the adders, 10a to 10d. Consequently, at the moment of switching, the same current will be directed onto the servovalves and the passage from automatic braking to braking by the pedals will be effected without jerks. The same will apply even if the two pedals are activated simultaneously beyond the first threshold.

In fact, the circuits $27_1$ and $27_2$ will each supply a state 1 to the AND gate 29 which will furnish a state 1 to the OR gate 30 and the same process as previously will be established.

The device according to the invention therefore enables passage from automatic braking to braking by the pedals without jerks at the moment of switching, and without substantial variation in deceleration, the current of the transmitter progressively replacing the current of automatic braking (in the negative sense).

It is possible, without departing from the scope of the invention, to use voltage instead of the currents, or to use currents increasing in the sense of braking instead of currents decreasing in the sense of braking. It is also possible to use currents or voltage which are either D.C. or A.C. Similarly, it is possible to use electronic relays instead of the electromechanical relays (or switches) shown.

What we claim is:

1. A device for automatically braking a wheel of a vehicle, in which a hydraulic brake, actuated by hydraulic fluid under pressure and controlled by a mechanical member, is associated with said wheel and is controlled by an electrohydraulic servovalve receiving an electric signal from a transmitter which converts the displacements of said mechanical member into electric signals, wherein between said transmitter and said servovalve, said device comprises a first switch which, for a first position, directly connects the transmitter and the servovalve and which, for a second position, connects said transmitter to a first input of a first adder having an output connected to said servovalve, said first adder having a second input connected to an automatic braking signal generator which comprises a generator emitting a predetermined braking signal which corresponds to the maximum pressure allowed for the hydraulic fluid in the brake and means for correcting said predetermined braking signal as a function of the difference between the actual deceleration of the vehicle and a predetermined reference deceleration.

2. A device as claimed in claim 1, wherein the automatic braking signal generator includes a decelerometer producing a first signal corresponding to the actual instantaneous deceleration of the vehicle, means for producing a second signal corresponding to the reference deceleration, a comparator which produces an output signal representing the difference between said first and second signals and a second adder having two inputs of different signs on which are received respectively the output signal of said comparator and said predetermined braking signal.

3. A device as claimed in claim 2, wherein the comparator takes the difference between the actual deceleration of the vehicle and the reference deceleration and, in the second adder, said difference is subtracted from said predetermined braking signal, unidirectional conduction means, disposed between said comparator and said second adder, transmitting this difference to the latter only if it is positive.

4. A device as claimed in claim 1, wherein the braking signal generator emits a signal representing, as a function of the time, the trend of loading of a capacitor.

5. A device as claimed in claim 4, wherein on the one hand the automatic braking signal generator may emit a plurality of signals of different speeds of establishment, whilst the means for producing the reference deceleration may produce a plurality of different values for said reference deceleration and on the other hand said device comprises a double selector adapted to choose simultaneously a torque associating an automatic braking signal and the corresponding reference deceleration value.

6. A device as claimed in claim 5, wherein said vehicle is an aircraft having front leading gear and in which the selector comprises a plurality of resistors having different resistance values, each of which corresponds to a different braking speed, wherein, on one of said resistors having the lowest resistance value and corresponding to the highest braking speed, there is disposed in parallel an auxiliary resistor by means of a contact activiated by the front landing gear of the aircraft, when said landing gear is extended and under stress.

7. A device as claimed in claim 1, in which said transmitter is of the type emitting an electric signal whose amplitude decreases as braking increases, wherein, in the first adder, the automatic braking signal is subtracted from a signal from the transmitter.

8. A device as claimed in claim 1, wherein the switch and the automatic braking signal generator are controlled by a single logic device with a plurality of inputs, on each of which is applied a signal representative of a condition necessary for the automatic braking device to function.

9. A device as claimed in claim 8 wherein the logic device controls said first switch and the automatic braking signal generator by means of a normally open second switch which can be closed by voluntary action of the operator of the device.

10. A device as claimed in claim 9, wherein said logic device introduces a predetermined delay in the time required for said second switch to move from open to closed.

11. A device as claimed in claim 8, wherein, between the generator emitting said predetermined braking signal and the second adder there is disposed an inhibitor controlled by the logic device.

12. A device as claimed in claim 8, wherein the logic device comprises a threshold circuit connected to said transmitter and adapted to restore the device into a normal, non-automatic braking mode, as soon as a signal from said transmitter exceeds a predetermined threshold.

13. A device as claimed in claim 1, wherein said vehicle is an aircraft having extendable main landing gear including left-hand wheels and comprising a mechanical member for braking the right-hand wheels and a mechanical member for braking the left-hand wheels, each wheel being associated with an electrohydraulic servovalve and a transmitter so that a single mechanical member controls a plurality of transmitters and a plurality of electrohydraulic servovalves, wherein between each transmitter and the corresponding servovalve, there is disposed a switch which, for the first position, directly connects the transmitter and the servovalve and which, for a second position, connects the the transmitter to an adder having a plurality of inputs and an output, one of said inputs being connected to said transmitter, said output being connected to the servovalve, the other inputs of said adder being connected to a common device for generating an automatic braking signal.

14. A device as claimed in claim 13, wherein all switches are controlled by a common logic device.

15. A device as claimed in claim 14, in which all the transmitters associated with a mechanical member are coupled, wherein the logic device receives via threshold circuits the signal from at least one transmitter associated with each mechanical member.

16. A device as claimed in claim 15, wherein the logic device comprises two first threshold circuits corresponding to a first threshold and two second threshold circuits corresponding to a second threshold, each of said threshold circuits having an input and an output, the input of one of said first threshold circuits and the input of one of said second threshold circuits being connected to a transmitter associated with the mechanical left-hand member and the input of the other of said first threshold circuits and the input of the other of said second threshold circuits being connected to the transmitter associated with the mechanical righthand member, whilst the outputs of said two first threshold circuits are connected to an input of an OR gate with four inputs via, respectively, and first AND gate with two inputs, and the outputs of said two second threshold circuits are respectively connected to two inputs of said OR gate, the output of said OR gate being connected on the one hand to one of its inputs via a second AND gate with two inputs, one of them being connected to a source of supply and the other to the output of said OR gate and on the other hand to an input of a third AND gate via a logic reversing switch.

17. A device as claimed in claim 16, wherein said aircraft is provided with extendable spoilers and wherein two other inputs of said third AND gate are each connected to a source of supply via two contactors open at rest, one activated when the spoilers of the aircraft are extended, the other when the main landing gear of the aircraft is extended and under stress.

18. A device as claimed in claim 16, wherein the output of the said third AND gate is connected in parallel to the switches and to the automatic braking signal generator.

* * * * *